United States Patent
Sacre et al.

(10) Patent No.: US 6,956,551 B2
(45) Date of Patent: Oct. 18, 2005

(54) DEVICE FOR DISPLAYING IMAGES BY PROJECTION, COMPRISING DICHROIC FILTERS WITH A GRADIENT

(75) Inventors: Jean-Jacques Sacre, Chateaugiron (FR); Nicolas Pitaval, Sorbiers (FR)

(73) Assignee: Thomson Licensing, Boulogne-Billancourt (FR)

(*) Notice: Subject to any disclaimer, the term of this patent is extended or adjusted under 35 U.S.C. 154(b) by 397 days.

(21) Appl. No.: 10/205,281

(22) Filed: Jul. 25, 2002

(65) Prior Publication Data

US 2003/0030649 A1 Feb. 13, 2003

(30) Foreign Application Priority Data

Jul. 27, 2001 (FR) .............................................. 01 10290

(51) Int. Cl.⁷ .................................................. G09G 3/36
(52) U.S. Cl. ........................... 345/88; 345/87; 348/757; 348/336; 348/337; 348/338; 348/780; 348/785; 359/634; 359/629; 359/583; 359/589
(58) Field of Search ....................... 345/87–88; 348/757, 348/336–338, 780, 785; 359/634, 629, 583, 589

(56) References Cited

U.S. PATENT DOCUMENTS

| | | | |
|---|---|---|---|
| 2,589,930 A | 3/1952 | Dimmick et al. ................. 88/1 |
| 2,945,413 A | 7/1960 | Kelly .............................. 88/1 |
| 4,400,722 A | 8/1983 | Miyatake et al. ............. 358/60 |
| 5,073,013 A | * 12/1991 | Sonehara et al. ............... 349/8 |
| 5,337,093 A | 8/1994 | Kaneko et al. ............. 348/778 |
| 5,530,489 A | * 6/1996 | Henderson et al. .......... 348/757 |
| 5,864,374 A | * 1/1999 | Ito et al. ..................... 359/634 |
| 5,986,815 A | * 11/1999 | Bryars ......................... 359/634 |
| 6,327,093 B1 | * 12/2001 | Nakanishi et al. .......... 359/634 |

FOREIGN PATENT DOCUMENTS

| | | | |
|---|---|---|---|
| EP | 0457404 A | 11/1991 | ............ H01J/29/89 |
| EP | 0477028 A | 3/1992 | ............ H04N/9/31 |

OTHER PUBLICATIONS

Patent Abstracts of Japan; vol. 016, No. 125 (P–1331), Mar. 30, 1992 & JP 03291644 A (Seiko Epson Corp), Dec. 20, 1991.

* cited by examiner

*Primary Examiner*—Matthew C. Bella
*Assistant Examiner*—Po Wei Chen
(74) *Attorney, Agent, or Firm*—Joseph S. Tripoli; Harvey D. Fried; Patricia A. Verlangieri (57) ABSTRACT

Device comprising:
  matrices of reflecting elements which can be electrically driven, and
  means for deconstructing a beam of polychromatic light and means for reconstructing complementary reflected beams, comprising two dichroic filters with a gradient where, for at least one of these filters, the direction of the gradient HOG, H'OG' makes an angle of inclination of non-zero gradient δ, δ' with a plane (DOE, D'OE') orthogonal to the reflecting surfaces of the matrices.
By virtue of the inclination of the gradient, the chromatic performance of the device is substantially improved.

6 Claims, 9 Drawing Sheets

DEVICE FOR DISPLAYING IMAGES BY PROJECTION, COMPRISING DICHROIC FILTERS WITH A GRADIENT

FIELD OF THE INVENTION

The invention relates to a device for displaying images on a projection screen of the type comprising, with reference to FIGS. 1 to 4:

- a light source 1 emitting a beam $B_S$ of generally white polychromatic light,
- means 2 for deconstructing this polychromatic light beam into complementary light beams $B_B$, $B_G$ and $B_R$, whose wavelength ranges are different and correspond to the three conventional primary colours blue B, green G and red R, respectively,
- in the path of each of the said complementary beams $B_B$, $B_G$ and $B_R$, matrices $M_B$, $M_G$ and $M_R$ of reflecting elements which are electrically driveable according to the images to be displayed,
- means 3 for reconstructing the reflected complementary beams $B'_B$, $B'_G$ and $B'_R$ into a single modulated polychromatic beam $B_P$,
- and an optical system 4 for projecting the images of the reflecting matrices $M_B$, $M_G$ and $M_R$ onto a screen (not shown), generally consisting of a projection objective after the said reconstruction of the beams.

BACKGROUND OF THE INVENTION

A device of this sort is used especially as a television back projector; the matrices of electrically driveable reflecting elements may, for example, be produced from:

- electrooptic modulators operating in reflection, based on liquid crystals (LC), especially liquid crystals applied on a silicon substrate (LCOS or "Liquid Crystal On Silicon");
- electrooptic modulators based on matrices of micromirrors, called "DMD" or "Digital Mirror Device".

In general, the matrices $M_B$, $M_G$ and $M_R$ are arranged so that the planes of their reflecting surface intersect along parallel straight lines; moreover, these reflecting surfaces are generally vertical and mutually orthogonal.

Figure 1:
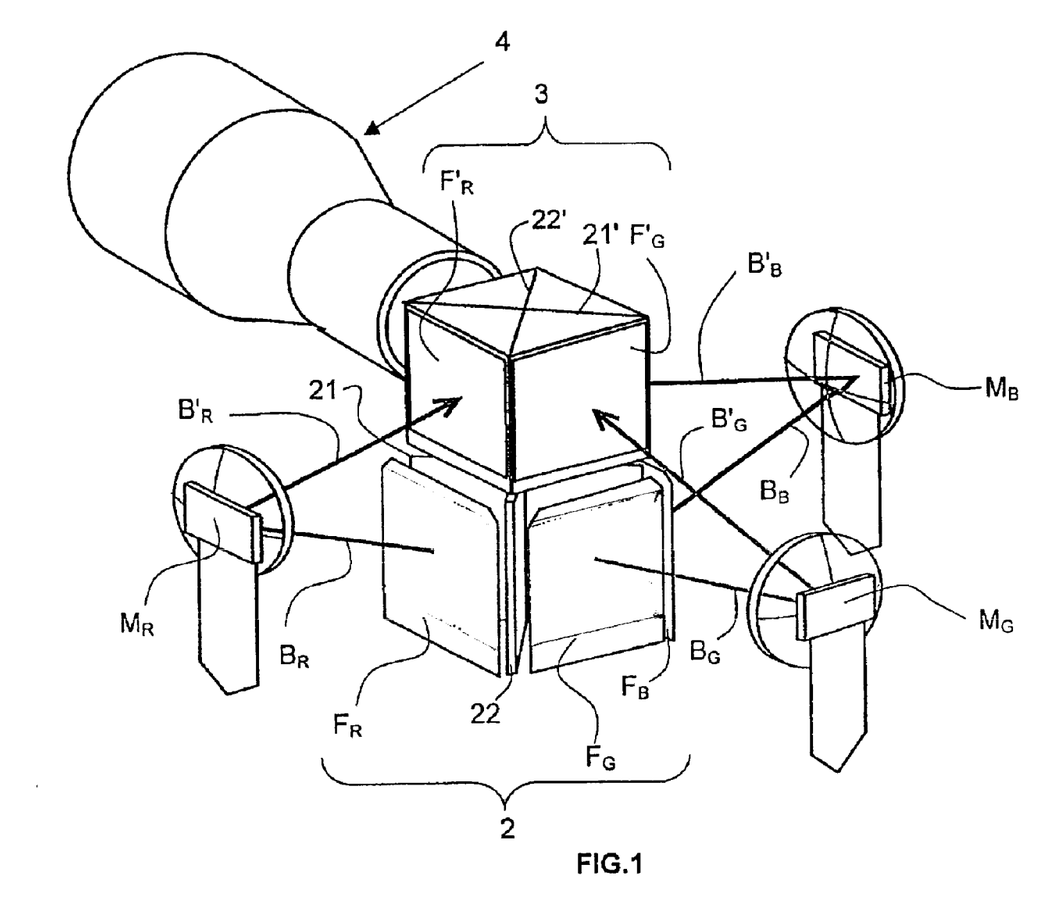
FIGS. 1 to 4, already described, are diagrams of an image display device common to the prior art and to the invention: in perspective view for FIG. 1, side views for FIGS. 2 and 3 and a bottom view for FIG. 4.
Figure 2:
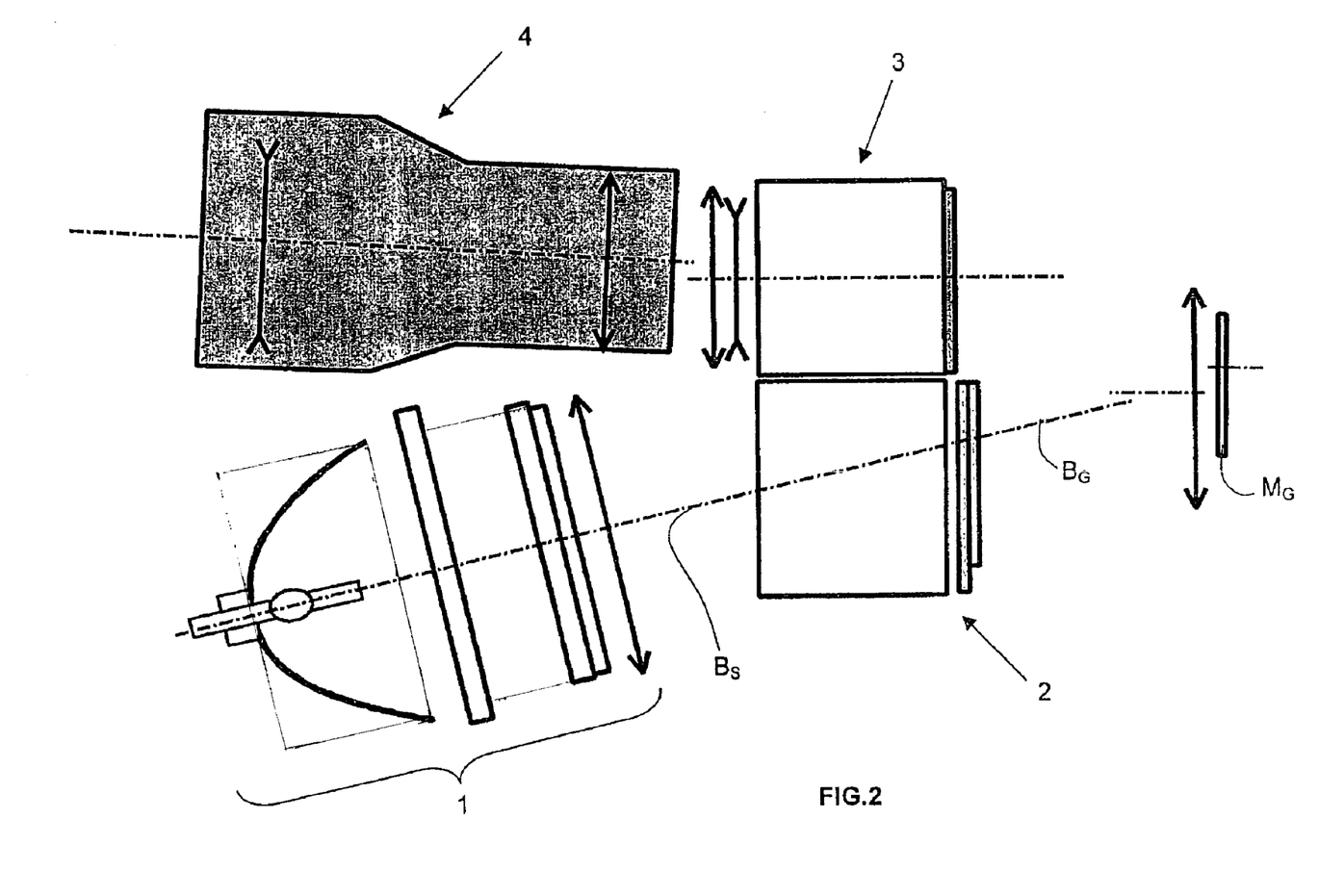

Conventionally, as illustrated in FIG. 1, the means 2 for deconstructing the beam $B_S$ of polychromatic light and/or the means 3 for reconstructing the reflected complementary beams $B'_B$, $B'_G$ and $B'_R$ each comprise two dichroic filters 21, 22; 21', 22' arranged at a predetermined mean angle of incidence β with respect to the optical axis of the incident beams to be deconstructed and/or reconstructed, each dichroic filter 21, 22; 21', 22' having, for this angle of incidence β, its cutoff wavelength matched, in a manner known per se, to deconstruct or reconstruct this or these incident beams; each filter generally being rectangular, the envelope of these two dichroic filters then forms a parallelepiped; the predetermined angles of incidence of these filters are generally about β=45° or 135°, such that the two filters 21, 22; 21', 22' are in general arranged orthogonally with respect to each other, as shown in FIG. 1.

On the side of the complementary beams $B_B$, $B_G$ and $B_R$ and/or $B'_B$, $B'_G$ and $B'_R$, it is possible to place filters, called confirmation filters, $F_B$, $F_G$ and $F_R$ on the one hand, $F'_B$ (not shown), $F'_G$ and $F'_R$ on the other hand.

Figure 4:
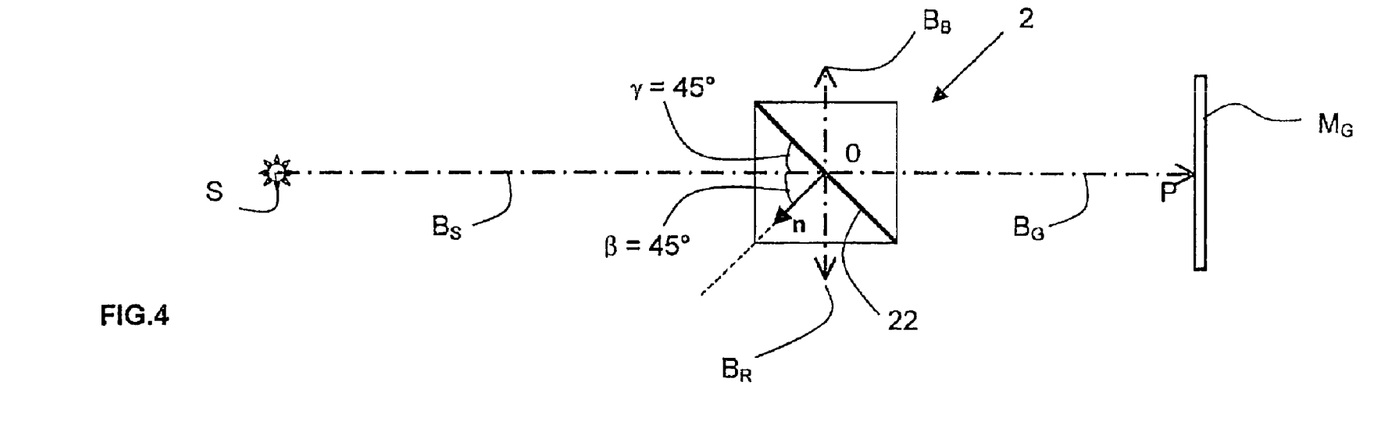

As shown in FIG. 1, the dichroic filters 21, 22; 21', 22' are placed on the vertical diagonals of the parallelepipeds and the confirmation filters $F_B$, $F_G$, $F_R$; $F'_B$, $F'_G$, $F'_R$ are placed on the vertical walls of these parallelepipeds; FIG. 4, which shows a partial bottom view of the display device where only the filter 22 of the deconstruction means 2 has been represented, clearly shows that this filter is placed along the diagonal of the parallelepiped; in this case, since the horizontal cross section of this parallelepiped is square, the angle of incidence β, formed at the centre O of the filter 22 by the optical axis of the polychromatic beam $B_S$ and the surface of this filter 22 is in this case 45°.

The longest dimension of the filters 21, 22; 21', 22' (the longest side of the rectangle) corresponds to the longest dimension of the matrices $M_B$, $M_G$ and $M_R$ of reflecting elements and the longest dimension of the images to be displayed; if the optical axis of each incident beam strikes the dichroic filter at a midpoint of incidence O and forms, at this point, an angle β=45° with the plane of this filter, the rays of this beam which strike the filter at points other than this midpoint of incidence O have angles of incidence which vary around this mean value of 45° (or of 135°); the variation of the angles of incidence is obviously greatest along the longest dimension of the filter.

Since the cutoff wavelength of a dichroic filter depends on the angle of incidence, many defects in beam deconstruction and/or reconstruction and chromatic defects would be obtained with a conventional dichroic filter.

To prevent these defects, it is known to use dichroic filters with a gradient, which have a constant cutoff wavelength along a direction parallel to their longest dimension located in a plane orthogonal to the reflecting surface of the matrices $M_B$, $M_G$ and $M_R$; this arrangement of the filters and this orientation of the gradient is perfectly matched to obtain a constant cutoff wavelength for all the rays of the beam located in this orthogonal plane; the direction of the index gradient of the layers of these filters is thus parallel to the longest dimension of these filters and included in this orthogonal plane.

Figure 3:
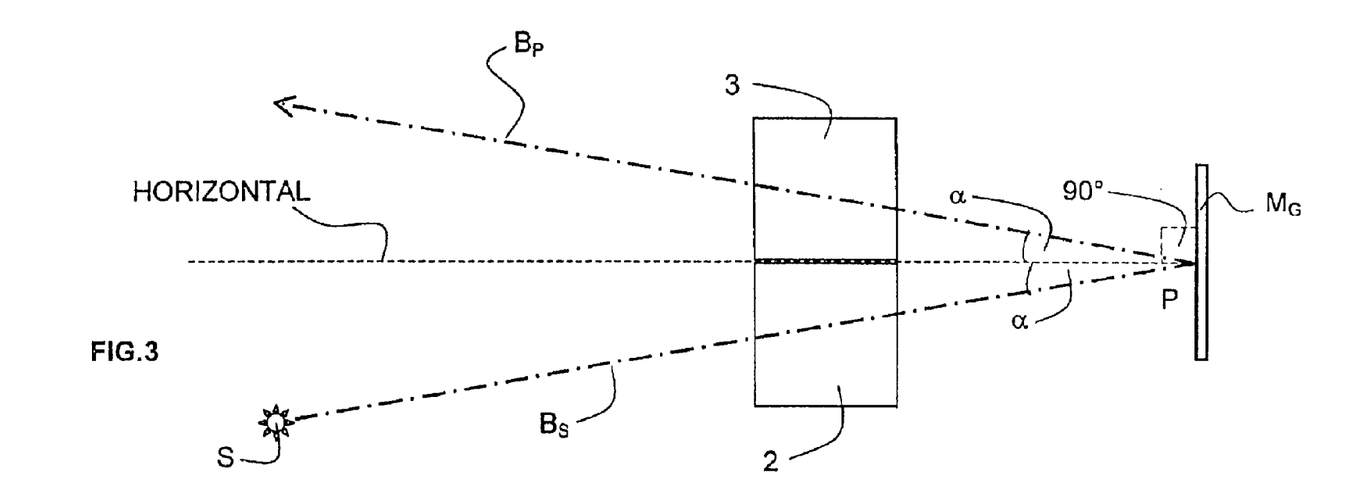

As illustrated in FIG. 3, which shows a partial schematic side view of the display device, since the matrices $M_B$, $M_G$ (shown alone) and $M_R$ for modulating the complementary beams operate by reflection, the angle of incidence α of the optical axis of each incident beam $B_B$, $B_G$ and $B_R$ respectively on each matrix $M_B$, $M_G$ and $M_R$ is different from the normal to these matrices, so that the incident beams $B_B$, $B_G$ and $B_R$ coming from the source 1 from the reflected beams $B'_B$, $B'_G$ and $B'_R$ directed towards the projection objective 5 can be properly separated; because the angle of incidence on each matrix $M_B$, $M_G$ and $M_R$ is different from the normal to these matrices, and because the deconstruction means 2 and the reconstruction means 3 are superimposed, the optical axis common to the beams $B_S$ and $B_G$ makes an angle of 2×α with the optical axis common to the beams $B'_G$ and $B'_P$ reflected on the matrix $M_G$; the value of the angle α depends on the dimensions and on the arrangement of the optical components of the display device; this angle α is generally between 5° and 20°; by way of example, in this case, this angle is 12°5.

Figures 5, 10:
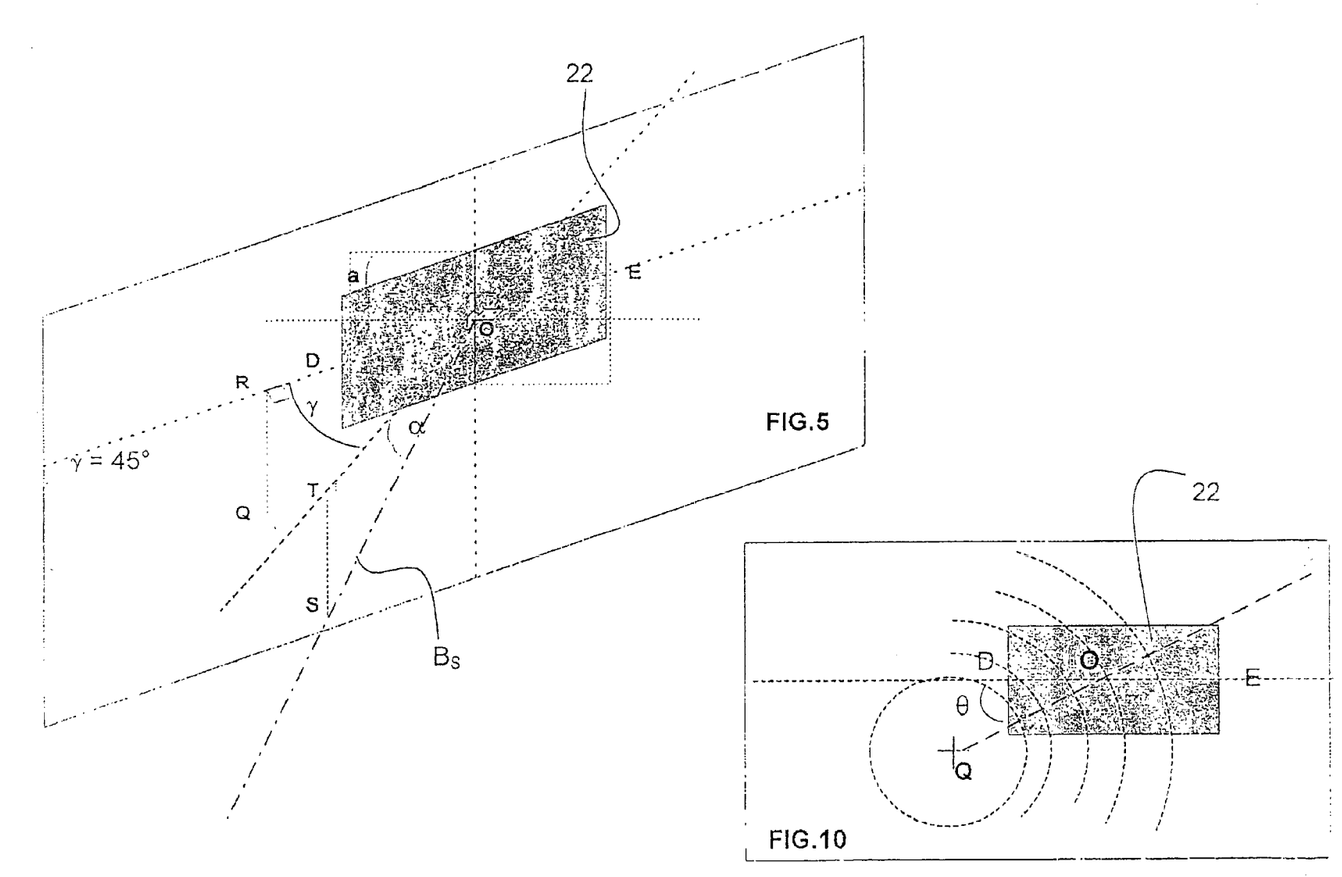
FIG. 5, already described, shows in perspective a dichroic filter for the device of FIGS. 1 to 4 and the positioning of the optical axis of the beam illuminating this filter, FIG. 6, already described, presents in perspective a dichroic filter for the device of FIGS. 1 to 4 and the positioning of the light ray extending in the longest dimension of the intersection of the incident beam with the filter.
FIG. 10 illustrates, by concentric circles, the distribution of the curves connecting the points of equal incidence on a dichroic filter, and the centre Q of these points which corresponds to zero incidence on this filter.

FIG. 5 shows a perspective view of the dichroic filter 22 (the shaded part in the figure) and of the optical axis of the polychromatic beam $B_S$ coming from the source S and passing through this filter at O; the projection of the central point S of the source onto a plane normal to the filter 22, intersecting it along a secant DOE passing through O, is called T; the projection of this same point S onto the plane of the filter 22 is called Q; also, the common projection of the point Q and of the point T onto the secant DOE is called R; it will be immediately deduced that, in the horizontal plane, the angle ROT=γ=90°−ββ45° and that, in the vertical plane, the angle TOS=α.

Figure 6:
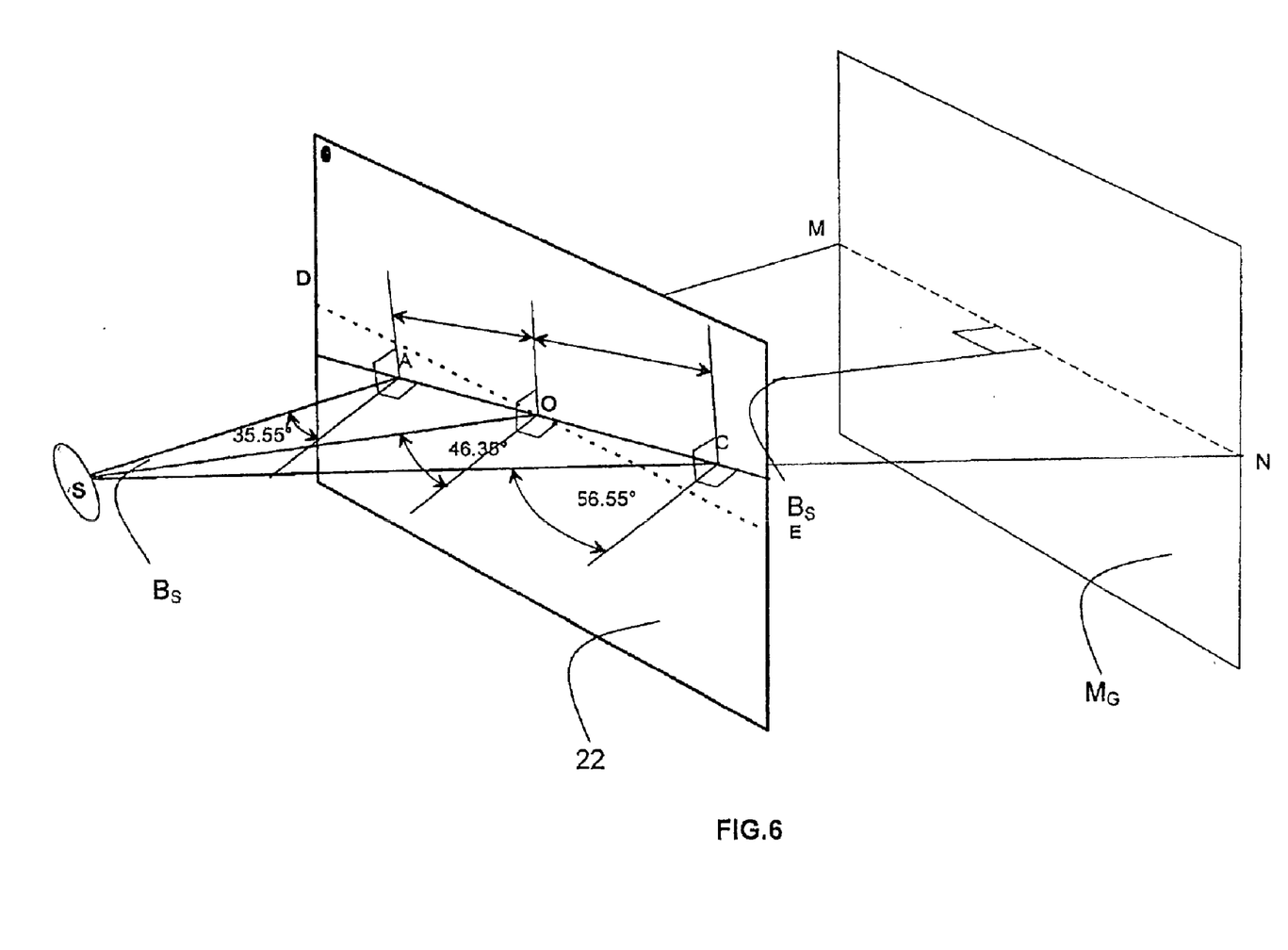

FIG. 6 shows, in a manner comparable to that of FIG. 5, the same rectangular dichroic filter 22; in this figure, the rays SAM, SOP and SCN are defined as forming a horizontal median line on the matrix $M_G$; it will be seen that, as indicated above, SA, SO and SC of the same beam $B_S$ which strike the filter at different points A, O and C, have angles of incidence which vary around a mean value; in this case, 35.55°, 46.35°, 56.55° respectively for a distance OA=OC= 20 mm.

Now, at the midpoint of incidence O of the filter, the cutoff lengths are set for a predetermined angle of incidence of 45°; because of the non-zero angle of incidence α=12°5 on the matrices $M_B$, $M_G$ and $M_R$, the difference in the angle of incidence (46.35° compared with β=45°) observed at the midpoint of incidence O of the filter compared to the predetermined angle of incidence β=45° leads to a detrimental shift in the cutoff wavelengths of the filter.

For the other points of incidence away from the midpoint of incidence O of the filter, especially the points of incidence such as A and C of the rays included in the longest dimension of the intersection of the incident beam $B_S$ with the filter 22, the direction of the filter gradient is not properly matched; this is because, since the filter gradient in this case extends in a conventional manner along a direction DOE parallel to the longest dimension of this filter DOE which does not correspond to that of the longest dimension AOC of the intersection of the incident beam $B_S$ with the filter 22 since the angle α is not zero, the gradient no longer corresponds to the distribution of angles of incidence for which the cutoff wavelengths remain constant; in other words, the filter gradient, which is matched to obtain constant cutoff wavelengths along the straight midline DOE is not matched in order to obtain constant cutoff wavelengths along the straight line AOC.

Thus, not only at the midpoint of incidence O of the filter, but along the entire longest dimension of the intersection of the incident beam $B_S$ with the filter, in this case the straight line AOC, the fact that the angle of incidence α on the matrices $M_B$, $M_G$ and $M_R$ is not zero leads, along this entire straight line AOC, to a difference between the actual angles of incidence and the ideal angles of incidence for which, by constructing the dichroic filter with a gradient, the cutoff wavelengths are constant; in spite of using a filter with a gradient, the fact that the angle α is not zero therefore leads to a detrimental shift in the cutoff wavelengths of the dichroic filters or of the deconstruction means 2, or of the reconstruction means 3, or even of both; this shift is detrimental since it leads to chromatic defects on the displayed image.

The aim of the invention is to prevent, or at least, to limit this drawback.

SUMMARY OF THE INVENTION

To this end, the subject of the invention is a device for displaying images on a projection screen of the type comprising:

a light source emitting a beam $B_S$ of generally white polychromatic light, means for deconstructing this polychromatic light beam into complementary light beams $B_B$, $B_G$ and $B_R$, whose wavelength ranges are different and correspond to the three conventional primary colours blue B, green G and red R, respectively, in the path of each of the said complementary beams $B_B$, $B_G$ and $B_R$, matrices $M_B$, $M_G$ and $M_R$ of reflecting elements which are electrically driveable according to the images to be displayed, reflecting complementary beams $B'_B$, $B'_G$ and $B'_R$, these matrices $M_B$, $M_G$ and $M_R$ being arranged so that the planes of their reflecting surfaces intersect along parallel straight lines, the optical axis of each incident complementary beam $B_B$, $B_G$ and $B_R$ making a non-zero angle of incidence α with the direction normal to the corresponding matrix $M_B$, $M_G$ and $M_R$, and the optical axis of each reflected complementary beam $B'_B$, $B'_G$ and $B'_R$ making the opposite angle −α with the normal to the corresponding matrix $M_B$, $M_G$ and $M_R$, means for reconstructing the reflected complementary beams $B'_B$, $B'_G$ and $B'_R$ into a single modulated polychromatic beam $B_P$, and an optical system for projecting onto a screen the images of the reflecting matrices $M_B$, $M_G$ and $M_R$ after the said reconstruction of the beams, the said deconstructing means and/or the said reconstructing means comprising two dichroic filters with a gradient arranged so that the optical axis of the incident beam or beams to be deconstructed and/or reconstructed forms, with these filters and at a midpoint of incidence O, an angle of incidence approximately equal to a predetermined angle of incidence $β_1$, $β_2$; $β'_1$, $β'_2$ corresponding to a cutoff wavelength matched to deconstruct or reconstruct the incident beam or beams, the cutoff wavelength of each filter being approximately constant for all the rays of the same beam whose points of incidence on the filter are aligned in the direction of the said gradient, characterized in that, for at least one of these filters, the direction of the gradient makes a non-zero angle of inclination of gradient δ, δ' with a plane orthogonal to the reflecting surfaces of the matrices $M_B$, $M_G$ and $M_R$.

In general, the said plane orthogonal to the reflecting surface of the matrices $M_B$, $M_G$ and $M_R$ is a horizontal plane.

Very commonly, the dichroic filters are placed in the deconstruction means and/or in the reconstruction means so that the predetermined angles of incidence $β_1$, $β_2$, $β'_1$, $β'_2$ are approximately equal to 45° or to 135°.

By virtue of the invention, the dichroic filters with a gradient are used in a way much closer to the ideal conditions and the chromatic defects of the displayed images are considerably limited.

Preferably, for the at least one filter, when the said angle of incidence α on the matrices $M_B$, $M_G$ and $M_R$ is between 5° and 20°, the angle of inclination of gradient δ, δ' is between 10° and 30°.

Preferably, for at least one filter, the angle of inclination of gradient δ, δ' is approximately equal to the angle θ defined between:

the straight line joining the point Q of zero incidence on this filter and the said midpoint of incidence O on this filter, and the said plane orthogonal to the reflecting surfaces of the matrices $M_B$, $M_G$ and $M_R$.

Preferably, for the at least one filter, the angle of inclination of gradient δ, δ' is approximately equal to arctan(sin (α)/sin(β).cos(α)), where β corresponds to the predetermined angle of incidence $β_1$, $β_2$; $β'_1$, $β'_2$ of the said filter.

BRIEF DESCRIPTION OF THE DRAWINGS

The invention will be better understood on reading the following description, given by way of non-limiting example, and with reference to the appended figures in which:

FIG. 11 shows a set of curves connecting the points of the dichroic filter oriented according to the invention which have a constant value for the difference between:

the actual angle of incidence of the rays of a beam on this filter, and the "ideal" angle of incidence for which the filter was designed, including its gradient.

DETAILED DESCRIPTION

In order to simplify the description and to highlight the differences and advantages exhibited by the invention compared to the prior art, identical references are used for the elements which have the same functions.

The display device according to the invention is identical to the device described above and illustrated in FIGS. 1 to 4, with one essential difference relating to the orientation of the gradient of at least one dichroic filter 21, 22; 21', 22' or of the deconstruction means 2, or of the reconstruction means 3, or both.

To simplify the summary, the invention will be described in the most common case where the reflecting surface of the matrices $M_B$, $M_G$ and $M_R$ is vertical and where the direction of the longest dimension of these matrices $M_B$, $M_G$ and $M_R$ is horizontal; this longest dimension corresponds to the longest dimension of the image to be displayed; thus a plane orthogonal to the reflecting surface of the matrices $M_B$, $M_G$ and $M_R$ is necessarily horizontal; and, at each of the matrices $M_B$, $M_G$ and $M_R$, the optical axis of the complementary beam $B_B$, $B_G$ or $B_R$ striking this matrix, the normal to this matrix, and the optical axis of the complementary beam $B'_B$, $B'_G$ or $B'_R$ reflected by this matrix are in the same vertical plane; finally, the planes of the reflecting surfaces of these matrices $M_B$, $M_G$ and $M_R$ intersect along vertical straight lines.

The dichroic filter 22 of the deconstruction means 2 of the invention will now be illustrated; it goes without saying that the invention is applicable in the same way to the other dichroic filters 21 of the deconstruction means 2, or 21' and 22' of the reconstruction means 3.

FIG. 4 illustrates, as in the prior art, the position of the filter 22 on the vertical diagonal of the parallelepiped of the deconstruction means 2; the vector $\vec{n}$ corresponds to the direction normal to the plane of this filter at the midpoint of incidence O of the optical axis of the beam $B_S$; the projection onto the horizontal plane (that of the drawing) of the angle of incidence of the optical axis of this beam on the filter corresponds to the angle β which in this case is 45°; the complementary angle γ is also therefore 45°.

Figure 8:
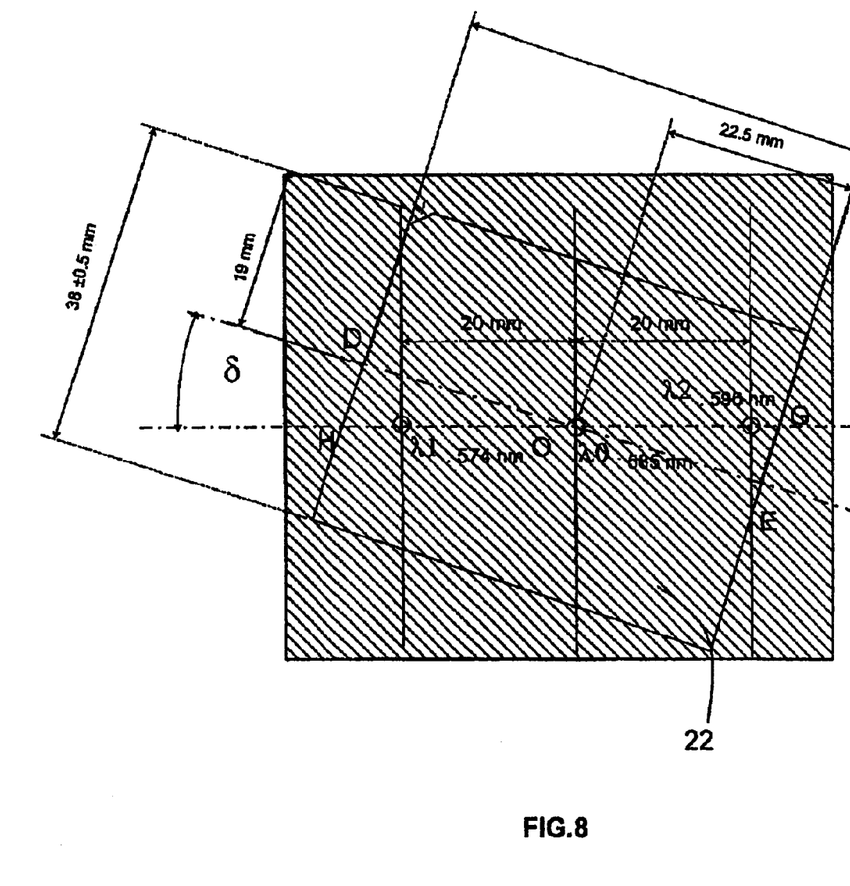
FIG. 8 illustrates a method of manufacturing a dichroic filter which can be used to implement the invention.

In FIG. 5, this horizontal plane cuts the plane of the filter along a mid line secant DOE parallel to the longest dimension of the filter, as in the prior art; FIG. 8 shows the same dichroic filter 22 and this same medium secant DOE; according to the invention, the gradient of this filter extends along a direction HOG making a non-zero angle δ with this secant; in other words, the direction of the gradient HOG of the dichroic filter 22 makes a non-zero angle δ with a plane orthogonal to the reflecting surface of the matrices $M_B$, $M_G$ and $M_R$; this inclination δ of the gradient is oriented in the same direction as the inclination AOC of the longest dimension of the intersection of the incident beam $B_S$ with the filter 22 (see FIG. 6); the value of the inclination δ and that of AOC are in general quite different.

By virtue of this inclination δ, where the angle α is not zero, the direction of the gradient of the filter is better matched than in the prior art, especially for the points of incidence away from the midpoint of incidence O of the filter, for example, for the points of incidence A and C (FIG. 6); this is because, since the gradient of the filter lies according to the invention in a direction HOG making an angle which is smaller than in the prior art with the direction AOC of the longest dimension of the intersection of the incident beam $B_S$ with the filter 22, the gradient corresponds better than in the prior art to the distribution of the angles of incidence for which the cutoff wavelengths remain constant; in other words, the orientation of the gradient of the filter is better matched than in the prior art in order to obtain constant cutoff wavelengths along the straight line AOC.

Thus, at the midpoint of incidence O of the filter and all along the largest dimension of the cross section of the incident beam $B_S$, this inclination δ of the gradient makes it possible to reduce the difference between the actual angles of incidence and the ideal angles of incidence for which, by construction of the dichroic filter with a gradient 22, the cutoff wavelengths are constant; this inclination δ of the gradient makes it possible to reduce the shift in the cutoff wavelengths of the dichroic filter 22 caused by the non-zero value of α and to limit the chromatic defects in the displayed image.

By means of a series of tests within the scope of a person skilled in the art, the inclination δ can be optimized as a function of the value of α; preferably, for $5° < α < 20°$, $10° < δ < 30°$ is chosen.

Figure 7:
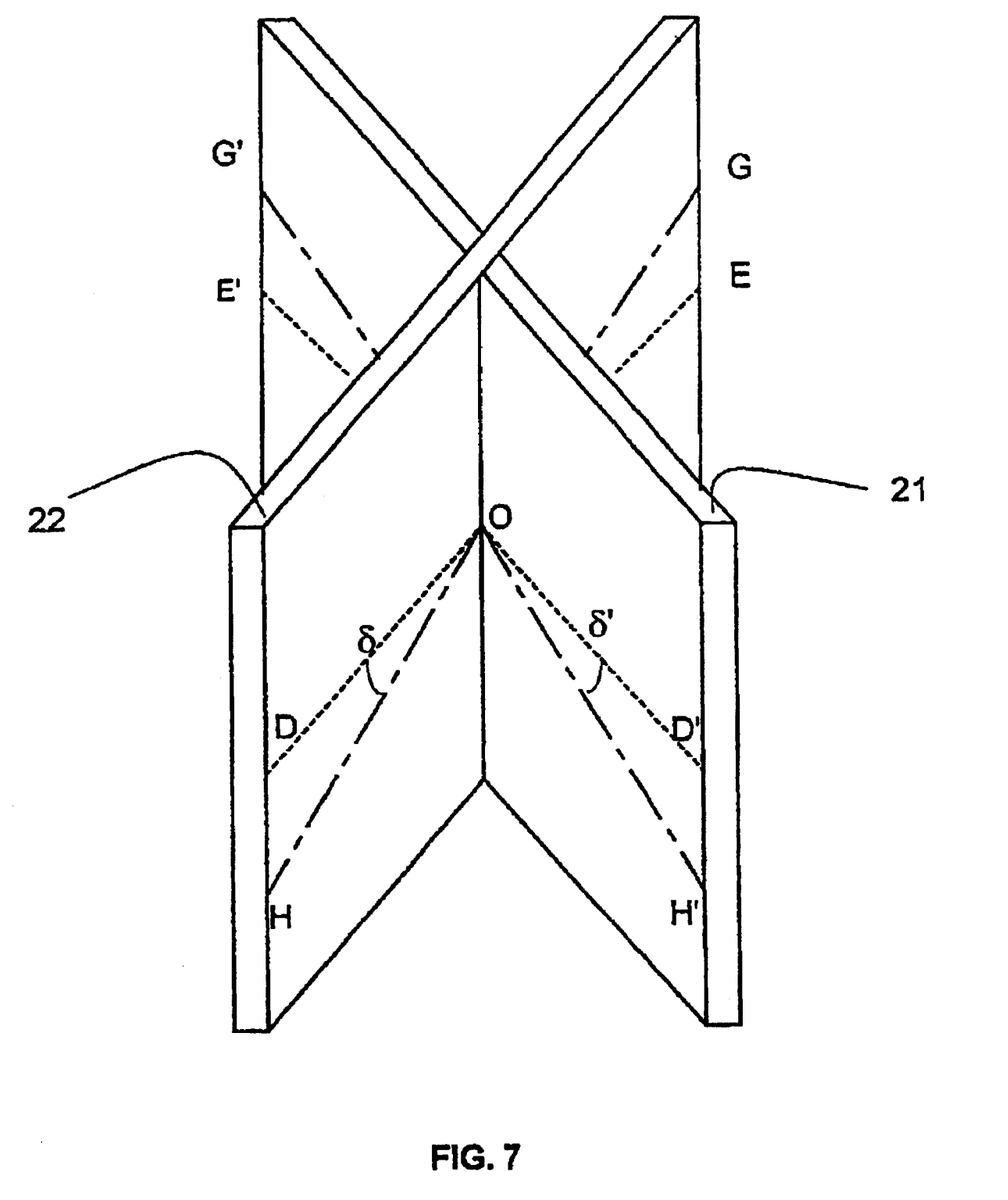
FIG. 7 illustrates one embodiment of the invention applied to the dichroic filters of the deconstruction means of the display device according to the invention.

The invention is advantageously applicable in the same way to the orientation of the gradients of the other filters 21, 21', 22'; FIG. 7 also illustrates the invention applied to the filter 21: the gradient of this filter which lies in the direction H'OG' makes a non-zero angle δ' with the direction D'OG' included in the horizontal plane.

Overall, an image display device with better chromatic quality than those of the prior art is thus obtained.

FIG. 8 shows a method of manufacturing the dichroic filter 22 of the device according to the invention, as shown in FIG. 7; this starts with a conventional basic dichroic filter (the hatched part of the figure) whose gradient lies in a direction HOG parallel to that of its longest dimension; another filter 22 is cut out of this conventional filter so that the direction DOE of its longest dimension makes an angle δ with the direction HOG of the greatest dimension of the base filter; thus a dichroic filter is obtained, the orientation of the gradient of which is inclined at an angle δ, as shown in FIG. 7.

A preferred implementational embodiment of the invention consists in positioning the filter whose defects it is desired to correct so that the angle δ made by the direction of the gradient of this filter with the horizontal plane is approximately equal to the angle θ which forms, with this same horizontal plane, the straight line joining the zero point of incidence on this filter and the midpoint of incidence of the optical axis of the beam $B_S$ or $B_P$ on this filter.

The phrase "angle δ approximately equal to the angle θ" means δ=θ±15%.

Figure 9:
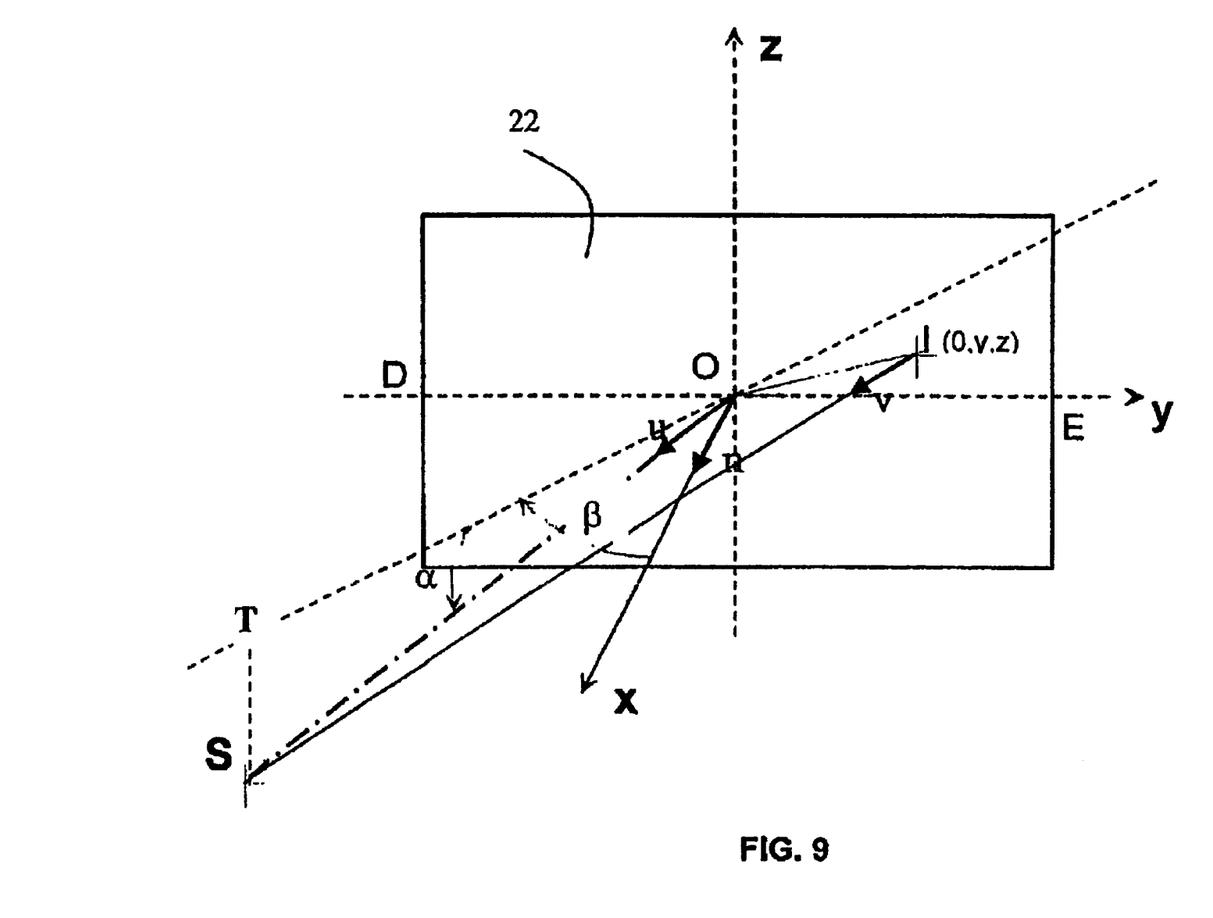
FIG. 9 shows any point I of incidence on a dichroic filter and the orthonormal coordinate system used to calculate the equations of the curves connecting the points of equal incidence of the filter.

With reference to FIGS. 5, 6 and 9, it is sought to calculate the angle θ for the filter 22.

Firstly, it is sought to calculate the equation of the curves which connect the points I of the filter where the rays of the incident beam $B_S$ have equal angles of incidence i.

With reference to FIG. 9 comparable to FIG. 5, an orthonormal coordinate system based on the midpoint of incidence O of the filter 22 is defined, comprising the coordinate axes Ox which is normal at O to the plane of the filter, Oy which is in the previously defined direction DOE, and Oz, perpendicular to Ox and Oy; in the particular case of this example, the axes Ox and Oy are therefore in a horizontal plane; as before (FIG. 5), the triangle OST is in a vertical plane, and the angle at the apex O corresponds to the angle of incidence α of the optical axes of the complementary beams on the matrices; the angle between the direction Ox and the direction OT corresponds to the angle of incidence β of the optical axis of the beam $B_S$ striking the filter, the complement of the angle γ in FIG. 5.

Let I be a point of incidence on the filter 22 of any ray SI of the beam $B_T$ from the source S; let O, y, z be the coordinates of this point in the orthonormal coordinate system; let i be the angle of incidence (not shown) of this ray SI with the filter 22; the angle i is therefore defined as the angle of this ray with the direction normal to the filter at the point I; let d be the distance OS from the centre S of the source to the midpoint of incidence O of the beam $B_S$ on the filter; let k be the length of the ray IS from this same source.

Let us also define the following elements: the vector $\vec{n}$ corresponds to the unit vector normal to the filter of the axis Ox, the vector $\vec{u}$ to the unit vector of the optical axis OS of the incident beam, and the vector $\vec{v}$ to the unit vector of the ray IS.

Firstly the distance IS=k is calculated as a function of the angle α, β and of the distance d; if the vector $\vec{IS}=k \times \vec{v}$, if the vector $\vec{OS}=d \times \vec{u}$, and since the coordinates of the vector $\vec{u}$ are (cos α.cos β; sin β.cos α; sin α), the vector equation IS=IO+OS makes it possible to calculate the value of k:

$$k^2=(y^2-2.d.y.\sin(\beta).\cos(\alpha)+z^2-2.d.z.\sin(\alpha)+d^2) \quad [1]$$

Moreover, since the projections of the vector OS and of the vector IS on the axis Ox are equal, we have:

$$k.\cos(i)=d.\cos(\beta).\cos(\alpha) \quad [2]$$

By combining equations [1] and [2], we get the following equation:

$$(y-d.\sin(\beta).\cos(\alpha))^2+(z-d.\sin(\alpha))^2=(d.\cos(\alpha).\tan(i))^2 \quad [3]$$

We can deduce immediately from this equation that the curves connecting the points I where the angle of incidence i of the rays of the beam $B_S$ is constant form concentric circles centred on a point of coordinates (0, d.sin(β).cos(α), d.sin(α)) and of radius R=d.cos(α).cos(β).tan(i); these concentric circles and their centre, the point Q, are shown in FIG. 10.

The centre of the circles corresponds to the zero point of incidence on the filter 22 and, given its coordinates, to the point Q of FIG. 5; from the coordinates of the point Q, we can therefore deduce the value of the angle θ formed between the straight line OP and the axis Oy (or the straight line OD), located in a horizontal plane:

$$\theta=\arctan(\sin(\alpha)/\sin(\beta).\cos(\alpha)) \quad [4]$$

For β=45° and for α=12°5, it can be deduced that θ=17°4

By varying the angle δ around the value θ, given the actual distribution of the light flux over the filter with a gradient, it was noticed that improved chromatic performance was obtained in the image displayed on the screen of the device according to the invention for values which could be slightly different from θ, such that δ=θ±15%.

Figure 11:
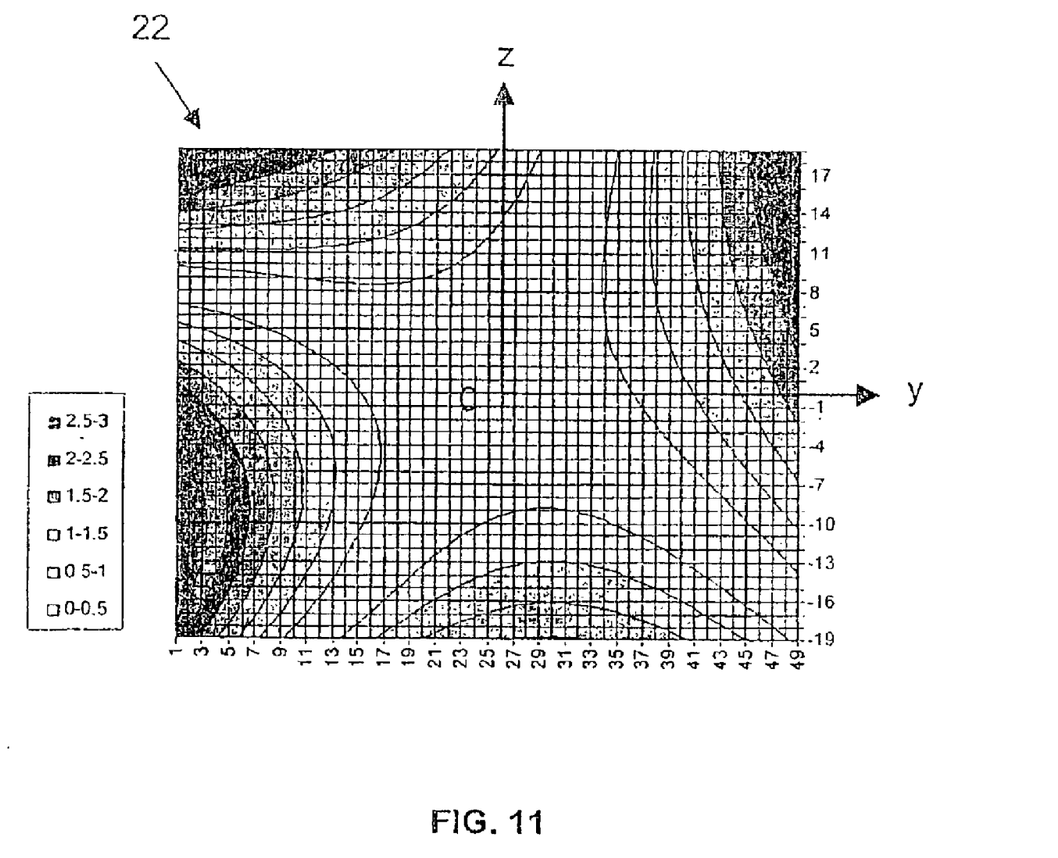

FIG. 11 illustrates the performance of the invention at the dichroic filter 22 itself, whose gradient has been inclined by an angle δ with respect to a horizontal plane, the value of this angle δ being optimized by one of the methods described above.

A set of curves connecting the points of the filter 22, for which the following difference is constant, is shown in this figure:

the actual angle of incidence of the rays of the beam $B_S$, and the "ideal" angle of incidence for which the filter has been designed, including its gradient.

The phrase "ideal angle of incidence" refers to angles of incidence for which, by construction of the filter, the cutoff wavelength is constant.

The coordinate systems are shown in millimeters (mm) along axes Oy, Oz, oriented in the same way as FIG. 9.

The clearest region of this FIG. 11 corresponds to the points for which the difference mentioned above is smallest, that is to say to the points for which the filter 22 is used very close to the ideal conditions; it is noticed in this figure that the clearest central region has a large area, which means that a very large part of the filter 22 is used very close to the ideal conditions, that is to say has a constant cutoff wavelength capable of reducing the chromatic defects; in comparison with other arrays of curves made from filters positioned without inclination, as in the prior art, it is noticed that the area of the very clear central region of FIG. 11 is much greater than in the prior art.

What is claimed is:

1. Device for displaying images on a projection screen of the type comprising:

a light source emitting a beam $B_S$ of generally white polychromatic light, means for deconstructing this polychromatic light beam into complementary light beams $B_B$, $B_G$ and $B_R$, whose wavelength ranges are different and correspond to the three conventional primary colors blue B, green G and red R, respectively, in the path of each of the complementary light beams $B_B$, $B_G$ and $B_R$, matrices $M_B$, $M_G$ and $M_R$ of reflecting elements which are electrically driveable according to the images to be displayed, reflecting complementary beams $B'_B$, $B'_G$ and $B'_R$, these matrices $M_B$, $M_G$ and $M_R$ being arranged so that the plane of their reflecting surfaces intersect along parallel straight lines, the optical axis of each incident complementary beam $B_B$, $B_G$ and $B_R$ making a non-zero angle of incidence $\alpha$ with the direction normal to the corresponding matrix $M_B$, $M_G$ and $M_R$, and the optical axis of each reflected complementary beam $B'_B$, $B'_G$ and $B'_R$ making the opposite angle $-\alpha$ with the direction normal to the corresponding matrix $M_B$, $M_G$ and $M_R$, means for reconstructing the reflected complementary beams $B'_B$, $B'_G$ and $B'_R$ into a single modulated polychromatic beam $B_P$, and an optical system for projecting onto a screen the images of the reflecting matrices $M_B$, $M_G$ and $M_R$ after the reconstruction of the beams, wherein one of the deconstructing means and reconstructing means comprise two dichroic filters with a gradient arranged so that the optical axis of at least one of the incident beam, the beam to be deconstructed and the beam to be reconstructed forms, with these filters and at a midpoint of incidence O, an angle of incidence approximately equal to a predetermined angle of incidence $\beta_1$, $\beta_2$, $\beta'_1$, $\beta'_2$ corresponding to a cutoff wavelength matched to deconstruct or reconstruct at least one incident beam, the cutoff wavelength of each filter being approximately constant for all the rays of the same beam whose points of incidence on the filter are aligned in the direction HOG, H'OG' of the gradient, wherein, for at least one of these filters, the direction of the gradient makes a non-zero angle of inclination of gradient $\delta$, $\delta'$ with a plane orthogonal to the reflecting surfaces of the matrices $M_B$, $M_G$ and $M_R$.

2. Device according to claim 1, wherein the plane orthogonal to the reflecting surface of the matrices $M_B$, $M_G$ and $M_R$ is a horizontal plane.

3. Device according to claim 1, wherein, for at least one filter, the predetermined angle of incidence $\beta_1$, $\beta_2$; $\beta'_1$, $\beta'_2$ is approximately equal to 45° or to 135°.

4. Device according to claim 1, wherein, for at least one filter, when the angle of incidence $\alpha$ on the matrices $M_B$, $M_G$ and $M_R$ is between 5° and 20°, the angle of inclination of gradient $\delta$, $\delta'$ is between 10° and 30°.

5. Device according to claim 1, wherein, for at least one filter, the angle of inclination of gradient $\delta$, $\delta'$ is approximately equal to the angle $\theta$ defined between:

the straight line joining the point Q of zero incidence on this filter and the midpoint of incidence O on this filter, and the plane orthogonal to the reflecting surfaces of the matrices $M_B$, $M_G$ and $M_R$.

6. Device according to claim 1, wherein, for at least one filter, the angle of inclination of gradient $\delta$, $\delta'$ is approximately equal to:

$\arctan(\sin(\alpha)/\sin(\beta).\cos(\alpha))$, where $\beta$ corresponds to the predetermined angle of incidence $\beta_1$, $\beta_2$; $\beta'_1$, $\beta'_2$ of the filter.

* * * * *